NEAL & EMERY.
Apparatus for Evaporating Saccharine Juices.
No. 27,258. Patented Feb. 21, 1860.
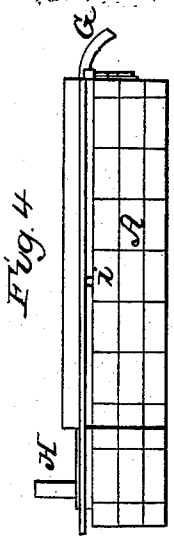
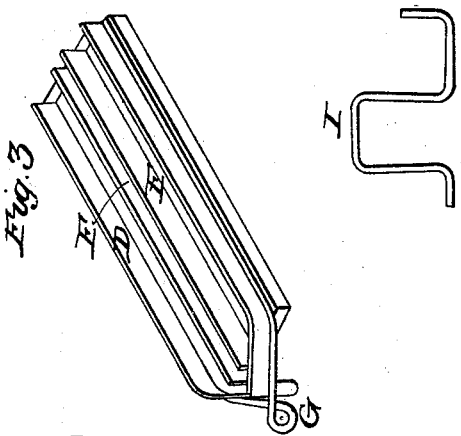
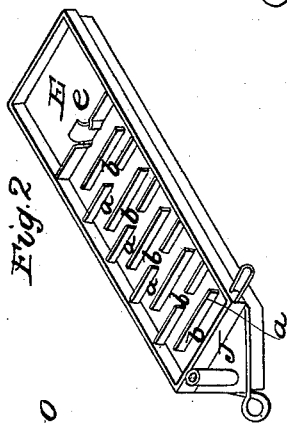
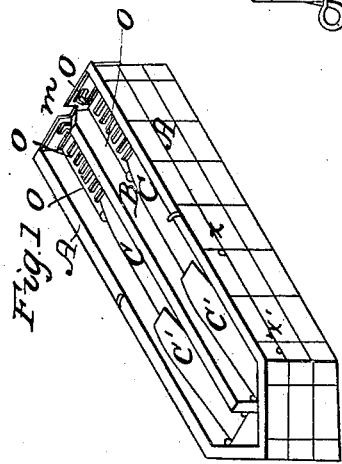
WITNESSES
C. M. Alexander
A. Yeatman
INVENTOR
Daniel B. Neal
H. C. Emery

UNITED STATES PATENT OFFICE.

D. B. NEAL AND H. C. EMERY, OF MOUNT GILEAD, OHIO, ASSIGNORS TO THEMSELVES AND GEORGE E. HOUSE, OF SAME PLACE.

IMPROVEMENT IN APPARATUS FOR EVAPORATING SACCHARINE JUICES.

Specification forming part of Letters Patent No. 27,258, dated February 21, 1860.

*To all whom it may concern:*

Be it known that we, DANIEL B. NEAL and H. C. EMERY, of Mount Gilead, in the county of Morrow and State of Ohio, have invented certain new and useful Improvements in Apparatus for Evaporating Saccharine Juices; and we do hereby declare that the following is a full, clear, and exact description of the same, reference being had to the accompanying drawings, and to the letters of reference marked thereon.

The nature of our invention consists in arranging and constructing the several parts of this apparatus, substantially in the manner hereinafter described.

In the annexed drawings, Figure 1 represents a perspective of the furnace, &c. Fig. 2 is a perspective of the top of the pan. Fig. 3 is a perspective of the bottom of the pan. Fig. 4 is a side elevation of the apparatus. Fig. 5 is a view of the crank for operating the dampers.

In the drawings, A represents a furnace, which is built of any suitable material, and of any desirable size. This furnace is divided longitudinally by means of a wall or partition, B, which extends up to within a few inches of the top of the said furnace.

*o o* represent grating immediately over the fire at the front of the furnace.

C C' represent dampers, which are situated on each side of the wall or partition B, said dampers being hinged at their rear ends, as seen at *x x'*. A crank-shaft, I, passes through the furnace and under the dampers, there being one shaft for each damper, by means of which the forward ends of said dampers are raised or lowered.

D represents a pan, which is made of any suitable material, which is placed upon the top of the furnace A. This pan is provided with a smoke-pipe, J, at its rear end, and with a bar, G, which passes around the outside of the pan longitudinally. When the pan is placed upon the furnace, the bar G rests at about its center upon the fulcrums *i*, which are placed on each side of the top of the furnace. The object of the fulcrums *i* is that the pan may be tipped front and rear, to make the juice placed in it run in whatever direction it may be necessary. The pan D is provided on its interior bottom with a series of divisions, (marked *a* and *b*.) The divisions *b* are so placed that their ends will not touch the sides of the pan, in order that the juice in passing through the pan may pass between the sides of the pan and the ends of the divisions *b*. The divisions *a* are divided at their centers—leaving an opening there, through which the juice may pass—the ends of the divisions *a* fit snugly up against the sides of the pan to prevent any passage of juice around them.

E represents a small pan, situated at one end of the main pan, and leading into said main pan through a door or opening at *e*. The pan D is also provided on its under side or bottom with two flanges, F F, which are secured to it longitudinally. These flanges fit snugly up against the wall B on each side, and together with the top of the wall and bottom of the pan form an air chamber or flue, through which cold air passes for cooling the material when necessary. The air passes into said chamber at *m*, and thence up the smoke-pipe H.

During the process of evaporating, the juice is made to pass from one end of the pan to the other, and at each time it passes through the openings in divisions *a* it passes over the air-chamber and is partially cooled. The scum, also, arising as the juice passes through these openings, is readily removed. The draft from the fire is shut off entirely or partially from the bottom of the pan by means of the dampers C C', as is readily seen.

Having thus fully described our invention, what we claim as new, and desire to secure by Letters Patent, is—

1. The employment in the furnace A of two flues, in combination with a central cooling air-chamber under the pan, the flues being divided from each other by means of a wall, B, and which are provided each with a series of dampers, C C', substantially as and for the purpose specified.

2. Providing the bottom of the pan with two flanges, which fit snugly against the sides of the wall B, the flanges, the wall, and the bottom of the pan forming the four sides of an air-chamber under the pan, substantially as and for the purpose specified.

DANIEL B. NEAL.
HOMER C. EMERY.

Witnesses:
A. K. DUNN,
W. W. IRWIN.